Nov. 11, 1941.  A. T. DEUTSCH  2,261,977

MATERIAL WORKING MACHINE

Filed July 5, 1940

INVENTOR.
ALEXANDER T. DEUTSCH.
BY
ATTORNEYS.

Patented Nov. 11, 1941

2,261,977

UNITED STATES PATENT OFFICE 2,261,977

MATERIAL WORKING MACHINE

Alexander T. Deutsch, Glendale, Ohio

Application July 5, 1940, Serial No. 343,974

5 Claims. (Cl. 107—14)

My invention relates to machinery for working of plastic materials in general, but more particularly foodstuffs. In the working of various kinds of doughs for different cooked foodstuffs, the ultimate dough should sometimes be light, and sometimes heavily condensed, with variations between. The ordinary machine in which material is forced through a passageway and thence through a restricted opening, thereby working it, there has not been, to my knowledge, any provision for variations in condensation of the materials extruded. My invention is directed to providing for such variation in a simple way either by replaceable or adjustable extrusion heads or by an extrusion head into which various inserts can be used to accomplish a like purpose.

The principle of my invention is based on the law of Gay-Lussac $p.v$=constant, which as here applied means that in a moving plastic or fluid body the velocity of movement times the pressure imparted to it, is a constant quantity. Thus if the velocity be increased the pressure will drop, and if the velocity be reduced the pressure will rise. As an illustrative means for imparting pressure and movement to a body to be worked I illustrate a screw operating in a casing. Beyond this screw is located a chamber terminated by an extrusion opening. The shape and dimensions of the said chamber will be the factor which controls the velocity of the material forced along the screw. Thereby I may utilize the force imparted by the screw to build up pressure on the materials to condense them by cutting down velocity of movement or I may by building up constantly increasing velocity cut down the pressure on the materials so as to leave them light and fluffy as extruded.

This, as above noted, I may do by replaceable or adjustable heads on the screw casing, or by using a common head into which various chamber modifying inserts can be placed.

Also, I may accomplish various other objects with my mechanism such as inserting one substance into another substance to make a filled pastry material, in which connection I can vary the density of the two substances which are so assembled.

Ordinarily, in order to prevent the possibility in the several shapes of chamber of the material forming a passageway through the chamber leaving the chamber otherwise filled with static material, the extrusion orifice is placed at right angles to the initial direction of movement of the material under the influence of the screw or other movement imparting mechanism.

In the drawing I have shown examples of my invention, it being understood that these are examples, the inventive concept inherent in which will be set forth in the claims that follow, to which reference is hereby made.

In the drawing—

Figure 1:
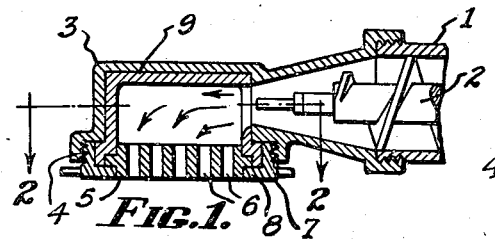
Figure 1 is a section showing the end of a screw operated material working machine showing one type of head.

The casing 1 of a screw operated machine is shown in Fig. 1 with a screw 2 operating therein. On the casing is screwed a head 3, which is arranged to have a dimension and shape to house various inserts as modifiers of this dimension and shape. The head is open at the bottom and provided, at right angle to its mounting on the casing 1, with a threaded opening 4. An orifice plate 5 having a series of small holes 6 therein, is arranged to be secured in the said threaded opening 4, by means of a threaded annulus 7 which has a supporting flange 8. Within the head is mounted a chamber modifying insert 9, which modifies the capacity of the head itself but does not substantially change the contour or design thereof. The annulus also holds this insert and also bears on the orifice plate so that the assesmbly is clamped up tightly by turning in the annulus.

In such a structure the velocity of the material as it enters the modified chamber is cut down considerably, wherefore the pressure builds up on the material and a dense substance emerges from the orifices in the orifice or extrusion plate.

Figure 3:
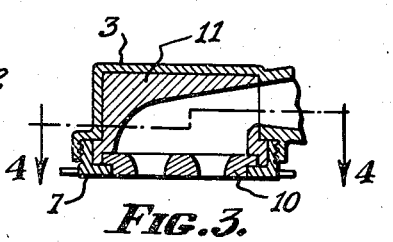
Figure 3 is a similar view to Figure 1 showing another type of insert and extrusion plate.
Figure 2:
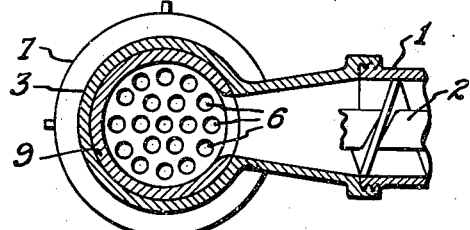
Figure 2 is a section along the line 2—2 thereof.
Figure 4:
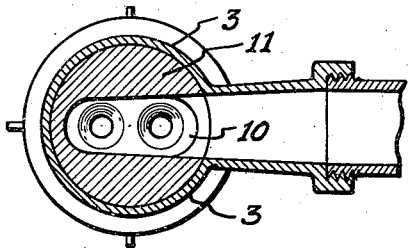
Figure 4 is a sectional view taken along the line 4—4 thereof.

In Fig. 3 the same head 3 is used, but a different orifice plate 10 and a different insert 11. This insert tapers from the opening in the head that is at the terminus of the screw, to the orifices in the plate, and as a result the velocity of the material increases as it approaches the orifices, and the pressure on the material drops rather than raises. A light or fluffy material is therefore extruded.

Figure 5:
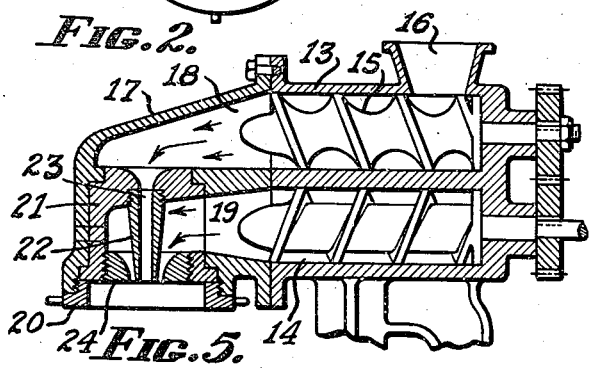
Figure 5 is a section of a multiple screw structure with a head adapted to a particular purpose.

In Fig. 5, I have shown a casing 12 having two cylinders 13 and 14 in each of which is a screw 15. There will be two hoppers 16 (one not shown) which will be filled with different material, one hopper leading to the inner end of the top screw, as shown, and the other hopper leading to the inner end of the bottom screw. The head in this instance, as shown at 17, is divided into two parts so that when mounted on the end of the casing there will be a passage 18 from the top cylinder and a passage 19 from the bottom cylinder. There is the usual annulus 20 threaded into the lower opening in the head at right angles to its mounting on the casing.

In the lower portion of the head a special insert is provided as illustrated generally at 21. This provides a partition between the halves of the head, a mounting for a quill 22 extending down from this partition which is threaded into an orifice 23 in the partition, a chamber extending from the passage 19, and an orifice plate 24 screwed into the bottom of an insert to provide a passageway around the lower end of the quill opening. The chamber in the upper portion of the insert tapers regularly toward the opening 23, and the lower chamber in the insert does not taper so sharply. The result is the extrusion of the material from the top screw at one density, into a surrounding envelope of the material from the lower screw at a different density.

Of course, the densities of the two materials can be changed by using a different shaped head, or different inserts. Also the upper screw and head can be omitted and the inner body be pushed down through the quill 22 by hand or in any other manner.

Figure 6:
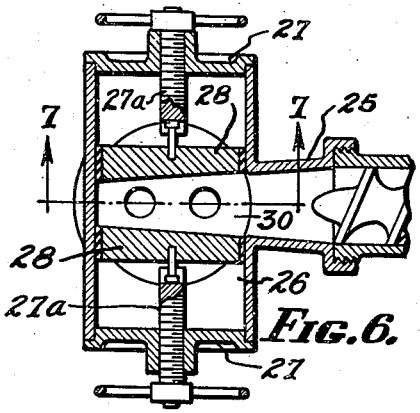
Figure 6 is a section showing an adjustable head.
Figure 8:
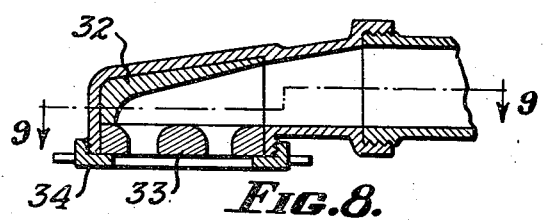
Fig. 8 is a section of another modification.
Figure 7:
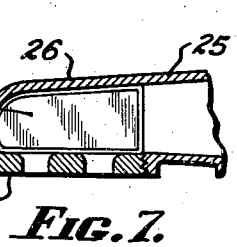
Fig. 7 is a section on the line 7—7 of Fig. 6.

Fig. 6 shows an adjustable device in the head. In this case the head 25 is provided with a threaded passageway portion which is attached to the end of the casing. From this portion the head spreads, with a cross section shown best in Fig. 7, this spread portion being indicated at 26. There are heads 27 in the ends of the spread portion 26, in which screws 27ª are mounted. On the screws and lying within the portion 26 are plates 28, of tapered construction (as illustrated) which act as pistons and can be screwed in or out to vary the chamber within the head. At the bottom of the portion 26 is a threaded opening 29 into which an orifice plate 30 can be screwed.

In this construction when it is desired to build up pressure on the material the pistons are withdrawn, and when it is desired to cut down the pressure on the material the pistons are brought toward each other. Various relationships can be attained by experiment with the material in hand.

Figure 9:
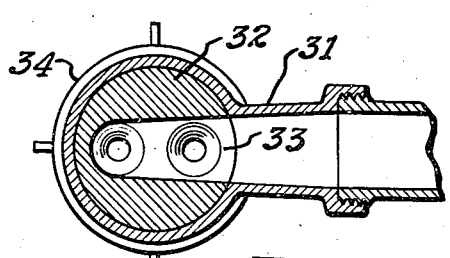
Fig. 9 is a section on the line 9—9 thereof.

In Fig. 9 I show a different form of head 31, to illustrate another type. This head is like the others but is tapered in itself. Insert 32 in this head can be used to cut down pressure and increase velocity in the material as it approaches the orifice plate 33, held in place by an annulus 34, this time interiorly threaded to engage external threads on the flange at the bottom of the head.

The material before reaching the extrusion element may be worked up by various mechanisms, with the screw feed serving as the means for imparting final movement to the material after it has been worked. Doughs, fruits, meats, sausage, or other food which it is desired to extrude at an optimum density, can be worked up in machines embodying my invention. Also plastics used in the arts where varying density is required may be extruded, such as rubber, resins, cellulose, clay, casein and others.

Having thus described my invention, what I claim as new and desire to secure by Letters Patent is:

1. In combination a casing having a feed screw therein for feeding material through the casing, head for the casing, a passage connecting said head and said casing, an orifice plate in the casing at an angle to the said passage, and a chamber within the head between the passage and the orifice plate, said chamber being shaped and dimensioned to control the velocity of materials passing through the head on the way to the orifice plate, thereby controlling the pressure on the material, said chamber in the head being controlled in shape by adjustable partitions therein.

2. In an apparatus for extruding plastic material, a casing, an Archimedean screw in said casing, a constricted throat for said casing, said screw extending partially into said throat, a head attached to said throat at the smaller end thereof, a demountable insert comprising an orifice plate in said head, one imperforate wall of said head and insert being disposed opposite the opening of said constricted throat at a substantial distance therefrom, said head, said insert, including said orifice plate, defining a chamber which is bounded at its furthest extent from said throat by said imperforate wall whereby to build up in said chamber a pressure on plastic material extruded through said throat into said chamber and through said orifice plate, to a degree regulated by the inclination of said imperforate wall towards said throat, the greater said inclination, the less being said pressure and the greater being the velocity of the plastic material passing through said orifice plate.

3. In an apparatus for extruding plastic material, a casing having two compartments, an Archimedean screw in each of said compartments, a pair of inner meshed gears behind the casing connecting and driving said screws, means for driving said gears, a hopper for introducing plastic material into each of said compartments, a prolongation of the casing extending beyond the forward end of said screws defining two prolongations of said compartments, means on said prolongations of the casing for attaching a head, a head attached to said prolongations, said head having an imperforate wall substantially opposite said prolongations of said compartments, and a demountable insert adapted to fit within said head, and an orifice plate carried by said insert, said orifice plate extending substantially parallel to said compartments and substantially at right angles to said imperforate wall of said head, the under interior of said insert being shaped and dimensioned to control the pressure and velocity of plastic material extruded into it by said screws from said compartments through said prolongations thereof and to direct same through said orifice plate.

4. In an apparatus for extruding plastic material, a casing having two compartments, an Archimedean screw in each of said compartments, a pair of inner meshed gears behind the casing connecting and driving said screws, means for driving said gears, a hopper for introducing plastic material into each of said compartments, a prolongation of the casing extending beyond the forward end of said screws defining two prolongations of said compartments, means on said prolongations of the casing for attaching a head, a head attached to said prolongations, said head having an imperforate wall substantially opposite said prolongations of said compartments, and a demountable insert adapted to fit within said head, said insert comprising a pair of movable walls, means for adjusting the position of said walls from the exterior of said head, and an orifice plate carried by said insert, said orifice plate extending substantially parallel to said compartments and substantially at right angles to said imperforate wall of said head, the upper interior of said insert being shaped and dimensioned to control the pressure and velocity of plastic material extruded into it by said screws from said compartments through said prolongations thereof and to direct same through said orifice plate.

5. In a machine for extruding plastic material, a casing, an Archimedean screw therein, a chamber demountably attached to said casing opposite said screw and adapted to receive material extruded from said casing, said chamber having a substantially vertical wall directly opposite said screw and said casing, a pair of plates slidable in said chamber to or away from the line of delivery of extruded material from said casing, means for adjusting and retaining each of said plates with sufficient rigidity to withstand the extrusion pressure of the material, inner surfaces on said plates tapering to form a more constructed passage near the chamber wall opposite said screw and said casing, and a demountable orifice plate mounted on said chamber in one of the walls thereof so as to constrain said extruded material to leave the chamber through said plate and at a substantial angle to the direction of flow established by the said screw, the said casing and the said plates.

ALEXANDER T. DEUTSCH.